United States Patent Office 2,729,674
Patented Jan. 3, 1956

2,729,674

DECARBOXYLATION OF TRIMELLITIC ACID

Art C. McKinnis, Long Beach, Calif., assignor to Union Oil Company of California, Los Angeles, Calif., a corporation of California No Drawing. Application February 8, 1954,
Serial No. 408,997

11 Claims. (Cl. 260—522)

This invention relates to methods for effecting mono-decarboxylation of trimellitic acid (benzene 1,2,4-tricarboxylic acid) to form corresponding dibasic acids. More specifically, the invention concerns methods which selectively remove the 1-carboxyl group whereby a product is obtained which is almost wholly isophthalic acid (benzene 1,3-dicarboxylic acid). The methods employed comprise essentially the heating of trimellitic acid in the presence of water and certain critical, less-than-stoichiometric proportions of alkalies. This procedure is found to yield a dibasic acid product which is e. g. about 95% isophthalic acid, with only minor proportions of terephthalic acid, and substantially no ortho-phthalic acid.

The aromatic dicarboxylic acids are highly important industrial raw materials by virtue of their use in the manufacture of polymeric ester resins, monomeric esters for plasticizers, and similar materials. Ortho-phthalic acid is most used for such purposes, but isophthalic acid is equal or superior to ortho-phthalic for most applications. Isophthalic acid may be manufactured by the controlled oxidation of pure meta-xylene. This oxidation may be performed in two separate stages, the first stage involving low temperature catalytic oxidation to meta-toluic acid, and the second stage involving a higher temperature, liquid phase, non-catalytic oxidation of the toluic acid to isophthalic acid. This process is economically undesirable in that it requires as the starting material substantially pure meta-xylene, which is very difficult to separate from p-xylene.

Alternatively, a mixture of isomeric xylenes may be similarly oxidized to produce a mixture of the corresponding dibasic acids, i. e. ortho-phthalic, isophthalic and terephthalic acids. Usually the product is also contaminated with benzoic acid and/or toluic acids. Benzoic, toluic and ortho-phthalic acids are easily separated by solvent extraction, or by other methods. However the separation of the remaining isophthalic acid from the terephthalic acid is more difficult and expensive. Solvent extraction involves the inherent disadvantage that the acids are only slightly soluble in most solvents. Fractional crystallization is also impractical because the acids tend to sublime. The chemical properties of the two acids are almost identical so that selective chemical action is generally uneconomical.

Isophthalic acid has therefore suffered an economic handicap in requiring, incident to its manufacture, either the difficult separation of meta- and para-xylene, or the difficult separation of meta- and para-phthalic acids. This factor has been largely responsible for the widespread use of ortho-phthalic acid, which may be cheaply produced by the oxidation of naphthalene. According to the present invention isophthalic acid may be produced from inexpensive, easily isolable, raw materials, and no difficult separations are involved, thereby rendering isophthalic acid competitive with orth-ophthalic acid.

The present invention takes an entirely new approach to the production of isophthalic acid. The trimellitic acid employed as starting material may be readily obtained by the oxidation of 1,2,4-trimethyl benzene (pseudocumene), or other 1,2,4-trialkyl benzenes. Pseudocumene, the principal raw material, may be readily separated by fractional distillation from the C-9 aromatic fraction obtained for example from the catalytic reforming or hydroforming of cracked and/or straight-run gasoline fractions. The use of 1,2,4-trialkyl benzenes provides a much more economical, plentiful, and versatile source of raw materials than the xylene fractions provide.

The primary object of this invention is therefore to provide more economical sources of raw material for the production of isophthalic acid. A more specific object is to provide economical methods for the mono-decarboxylation of trimellitic acid to form selectively isophthalic acid in preference to the other isomeric acids. A still further object is to provide economical raw materials for isophthalic acid which may be readily separated from other materials with which they occur. Still further objects include the provision of techniques for the process which will reduce corrosivity, heat requirements, and reaction time to practical minimum values. Other objects and advantages will be apparent to those skilled in the art from the more detailed description which follows.

Very little is apparently known about the decarboxylation of trimellitic acid. It is known generally that polycarboxylic aromatic acids which contain ortho-carboxyl groups may be decarboxylated under the influence of heat and/or catalysts to remove one of the ortho-carboxyl groups. Ortho-phthalic acid and hemi-mellitic acid (1,2,3-benzene tricarboxylic acid) for example may be mono-decarboxylated to produce respectively benzoic acid and isophthalic acid. Insofar as I am aware however, no decarboxylation methods are now known for producing substantially pure isophthalic acid from higher carboxylated acids, nor for mono-decarboxylating trimellitic acid in the 1- or 2-position.

Considering trimellitic acid as a raw material, it would appear that the mono-decarboxylation thereof would probably yield isophthalic acid, terephthalic acid, or a mixture thereof, and possibly some ortho-phthalic acid if water is not present to prevent the formation of the anhydride between the two ortho-carboxyl groups. After extensive experimentation and the consideration of many methods, some of which actually gave predominantly terephthalic acid, or mixtures containing terephthalic acid, the present method was discovered which commonly results in the production of a product which is at least about 95 mole percent isophthalic acid, and not more than about 5 mole percent terephthalic and ortho-phthalic acids.

The actual process employed for achieving the above results is extremely simple. Trimellitic acid, either in pure form or admixed with other oxidation products, is admixed with water and sufficient of, e. g. a monobasic alkali to provide between about 0.1 and 2 moles thereof per mole of the portion of trimellitic acid which is in solution at the reaction temperature. The mixture is then heated under pressure at e. g. 150°–400° C., and preferably between about 220° and 350° C., until the evolution of $CO_2$ ceases. This usually requires from about 15 minutes to three hours, depending upon the temperature. Trimellitic acid is considerably more soluble in water than is isophthalic acid, and hence the latter may continuously precipitate out as formed if low reaction temperatures are employed. The trimellitic acid may be wholly or partly in solution at the inception of reaction. As the dissolved trimellitic acid is converted to isophthalic acid, more trimellitic dissolves until the reaction has gone to substantial completion.

Ordinarily, at the preferred temperature range of 220°–

350° C., the trimellitic acid is miscible in all proportions with water. The isophthalic acid formed, which melts at about 330° C., will either form a solid phase, or may remain dissolved in the reaction mixture. The phase relationships obtaining during reaction depend largely upon temperature and the proportion of water employed. If a concentrated solution of trimellitic acid is employed, the isophthalic acid may largely remain dissolved if the original solution is dilute it is probable that most of the isophthalic acid formed is in a second solid phase. It is found that the decarboxylation proceeds more rapidly in dilute solutions, which may be a result either of more favorable ionic equilibria, or the elimination of isophthalic acid from the aqueous phase. It is therefore preferable to maintain in the reaction vessel at least about 500 ml. of water per mole of dissolved trimellitic acid.

A critical aspect of the invention resides in the proportion of alkali employed. It is found that if there is sufficient alkali to combine with all the trimellitic acid carboxyl groups in solution, i. e. three or more moles of monobasic alkali or 1.5 moles of dibasic alkali, per mole of trimellitic acid, substantially no decarboxylation will occur. On the other hand, if no alkali is employed, a mixture of isophthalic and terephthalic acids is produced, typically comprising about 60% of the former and 40% of the latter.

The alkali employed is preferably monobasic, and should preferably form water-soluble dihydrogen salts with trimellitic acid. This preferred class includes primarily the alkali metal hydroxides, carbonates, bicarbonates, phosphates and the like, as well as ammonium hydroxide. Organic bases may also be employed, e. g. methylamine, dimethylamine, trimethylamine, ethylamine, ethanolamine, pyridine, etc. However, any alkaline material may be employed, including the alkaline earth hydroxides, magnesium hydroxide and the like. The preferred alkalis are lithium, sodium, potassium and ammonium hydroxides.

The preferred operative proportions of alkali may be defined in terms of relative normality; i. e. the trimellitic acid hydrogen normality of the reactant solution should be maintained at between about 1.5 and 30 times the normality of the alkali, and preferably between about 3 and 15 times its normality. If the trimellitic acid is initially all in solution, it will be apparent that as the reaction proceeds and isophthalic acid is formed, the trimellitic acid hydrogen normality of the solution will decrease while the alkali normality will remain fairly constant. In this case therefore, it will be necessary to add, continuously or intermittently, sufficient trimellitic acid to maintain the operative ratio of acid to base.

It should be noted that the acid hydrogen of the 1-carboxyl group of trimellitic acid is more strongly ionized than the acid hydrogens on the 2 and 4 positions, or the acid hydrogens of isophthalic acid. It is therefore probably the specific effect of the base on the 1-carboxyl group which is responsible for the peculiar results observed. Also, as a corollary thereto, since isophthalic is a much weaker acid than trimellitic, it is not critical as to whether the former remains dissolved in the reaction medium or forms a separate phase; in either case the base remains largely associated with the 1-carboxyl group of trimellitic acid.

A very convenient method for carrying out the process consists in heating the reaction mixture with agitation, continuously withdrawing a slip-stream, cooling if it necessary to precipitate isophthalic acid, separating the isophthalic acid therefrom, adding to the remaining slip-stream liquor an amount of trimellitic acid approximately equivalent to the isophthalic acid removed, and returning the augmented stream to the reaction vessel. It may be necessary to add small amounts of alkali and water occasionally to make up for slight losses. In this manner the desired ratio of alkali to trimellitic acid may be continuously maintained in the reaction vessel.

The crude isophthalic acid which is initially formed is ordinarily sufficiently pure after a simple water wash for most uses. However, it may be further purified if desired, as by washing with hot water or hot methanol and the like. The product may be recrystallized if desired from other solvents. Alternatively, the acids may be separated by selective esterification, the isophthalic acid being more readily esterifiable.

In one modification of the process, a crude mixture of carboxylic acids obtained by the oxidation of mixtures of isomeric C-9 and/or C-10 aromatic hydrocarbons may be decarboxylated to give a final product which is 80-90% isophthalic acid. The mixed aromatic hydrocarbons may be obtained by known methods from gasolines which have been subjected to catalytic reforming or hydroforming operations. The isomer distribution in the C-9 and C-10 aromatic fractions obtained from such gasolines is such that the oxidation-decarboxylation product, after removal of water-soluble acids, is usually 80-90% isophthalic acid, the remainder being almost exclusively terephthalic acid. The principal hydrocarbons in such fractions, and their corresponding oxidation and decarboxylation products are shown in the following table:

TABLE I

| Hydrocarbon | Boiling point, °C. | Acid obtained by oxidation | Principal decarboxylation product, and water-solubility thereof. |
|---|---|---|---|
| C-9 Aromatics: | | | |
| isopropylbenzene | 152.4 | benzoic | benzoic (s.). |
| propylbenzene | 159.2 | do | Do. |
| m-ethyltoluene | 161.3 | m-phthalic | m-phthalic (ins.). |
| p-ethyltoluene | 162.0 | p-phthalic | p-phthalic (ins.). |
| mesitylene (1,3,5-trimethyl benzene). | 164.7 | trimesic | trimesic (v. s.). |
| o-ethyltoluene | 165.1 | o-phthalic | o-phthalic (s.). |
| pseudocumene (1,2,4-trimethyl benzene). | 169.1 | trimellitic | m-phthalic (ins.). |
| hemimellitene (1,2,3-trimethyl benzene). | 176.1 | hemimellitic | m-phthalic (ins.). |
| C-10 Aromatics: | | | |
| m-diethylbenzene | 181 | m-phthalic | m-phthalic (ins.). |
| o-diethylbenzene | 183 | o-phthalic | o-phthalic (s.). |
| p-diethylbenzene | 184 | p-phthalic | p-phthalic (ins.). |
| 2-ethyl-p-xylene | 185 | trimellitic | m-phthalic (ins.). |
| 5-ethyl-m-xylene | 186 | trimesic | trimesic (v. s.). |
| 4-ethyl-o-xylene | 186 | trimellitic | m-phthalic (ins.). |
| durene (1,2,4,5-tetramethyl benzene). | 194 | pyromellitic | Do. |
| isodurene (1,2,3,5-tetramethyl benzene). | 197 | prehnitic | trimesic (v. s.). |

It will be seen therefore that the only acids in the final mixture which are water-insoluble are isophthalic and terephthalic. The water-soluble acids usually comprise only a minor proportion of the total decarboxylation product.

The invention may perhaps be more readily understood from the following examples which are, however, illustrative only:

*Example I*

This example illustrates the use of various proportions of alkali, and shows the critical relationship existing in the acid-base ratios.

One-half mole (105 gms.) of trimellitic acid is placed in each of three stainless steel pressure vessels equipped with agitators and pressure relief valves. About 500 ml. of water is then added to each vessel. To vessel No. 1 is added 60 gms. (1.5 moles) of sodium hydroxide. To vessel No. 2 is added 4 gms. (0.1 mole) of sodium hydroxide. No alkali is added to the third vessel. Each vessel is then heated with stirring at 250°–290° C. for 1.5 hours, after which time the evolution of $CO_2$ substantially ceases. The contents of each vessel is then cooled to about 80° C. and filtered. The solid precipitate in each case is washed with 400 ml. of hot water, and then dried in an air stream at 70° C. Analysis of the products from the three runs gives the following comparative data:

TABLE II

| Product | Wt., gms. | Isophthalic acid, Wt. Percent | Terephthalic acid, Wt. Percent | Total Conversion to Dibasic acids |
|---|---|---|---|---|
| Vessel No. 1 | (1) | (1) | (1) | (1) |
| Vessel No. 2 | 67 | 96.1 | 3 | 80.7 |
| Vessel No. 3 | 58 | 60.2 | 39 | 70.0 |

[1] No solid product obtained.

Further analysis of the soluble product from vessel No. 1 showed it to consist of trisodium trimellitate almost exclusively. The aqueous mother liquor from vessel No. 2 is found to contain about 18 gms. of trimellitic acid in the form of sodium salts, and the total yield of dibasic acids from this run, based on trimellitic acid converted, is therefore 97.5%. The aqueous mother liquor from vessel No. 3 is found to contain about 30 grams of trimellitic acid, and the yield from this run is therefore 98.5%.

This example shows, by the improved conversion in vessel No. 2, as compared to vessel No. 3, that the alkali actually accelerates the decarboxylation until the ratio of alkali to trimellitic acid becomes too large.

*Example II*

This example illustrates a suitable continuous method for effecting the decarboxylation. Sufficient trimellitic acid is added to 2 liters of water in a stainless steel pressure vessel equipped with agitator, gas relief valve, and a liquid withdrawal port in the lower section, to form a saturated solution at 60° C. At this temperature the solubility of trimellitic acid is approximately 190 gms. per liter. Forty grams of sodium hydroxide is then added, thereby forming a solution which is about 2.71 N with respect to trimellitic acid and 0.5 N with respect to sodium hydroxide. The mixture is heated at 300°– 320° C. with good agitation for an initial period of 30 minutes. While continuing heating and agitation, the liquid withdrawal port is then opened sufficiently to withdraw continuously a slip-stream of liquid product at the rate of about 15 ml./minute. The slip-stream is cooled in a water-jacketed tube to 60° C., forced under pressure through a filter press, and then percolated through a bed of solid trimellitic acid at 60° C. in order to form a saturated solution. The resulting solution is then pumped back into the reaction vessel at a second inlet port in the mid-section thereof. Gaseous $CO_2$ is continuously exhausted through the gas relief valve. Solid isophthalic acid is periodically removed from the filter press and washed with hot water. A small amount of 0.5 N sodium hydroxide solution is added to the slip-stream occasionally to make for small losses in the solid product.

After operating in this manner for a period of 12 hours, 1920 gms. of solid product is obtained which analyzes 96.4% pure isophthalic acid. The over-all yield of pure isophthalic acid, based on the trimellitic acid consumed, is 94.3%.

*Example III*

This example illustrates the results obtainable by decarboxylating the mixed acids obtained by oxidation of a mixture of C–9 and C–10 aromatic hydrocarbons.

The mixed acids are obtained by oxidizing a C–9, C–10 fraction (B. P. 150–200° C.) of the aromatic hydrocarbons extracted from a full-range naphthenic gasoline which had been subjected to hydroforming-aromatization in the presence of a platinum-alumina catalyst at 950° F., 1.0 L. H. S. V., 10,000 S. C. F. of hydrogen/bbl. of feed, and at a pressure of 200 p. s. i. g.

The C–9, C–10 hydrocarbon fraction was oxidized first with air in the presence of a cobalt naphthenate catalyst at 150° C. for 3 hours, and then with 30% nitric acid at 200° C. for 1 hour in the absence of catalyst.

The oxidation mixture, which comprises mainly trimellitic, trimesic, hemimellitic, pyromellitic, prehnitic, o-, m- and p-phthalic, and benzoic acids is then subjected to decarboxylation under the conditions outlined in Example II, employing 0.5 N sodium hydroxide, and maintaining the reaction mixture about 3.5 N with respect to the initial acid mixture. The product is composed approximately as follows:

| Component: | Weight percent |
|---|---|
| Benzoic acid | 1.5 |
| o-phthalic acid | 4 |
| trimesic acid | 14 |
| p-phthalic acid | 9 |
| m-phthalic acid | 69 |

This mixture is then water-washed to remove the trimesic, benzoic and o-phthalic acids, leaving a final product which is approximately 89% isophthalic acid and 11% terephthalic acid. This example shows that the bulk of the higher hydrocarbons such as durene, 4-ethyl-o-xylene, 2-ethyl-p-xylene, as well as substantially all of the pseudocumene and hemimellitene are ultimately converted to isophthalic acid. The 1,3,5-hydrocarbons are converted to trimesic acid which is readily separated by water washing. Nearly all of the terephthalic acid which is produced comes from the original para-dialkyl benzenes.

Substantially the same results are obtained in all the above examples by substituting equivalent amounts of potassium, lithium or ammonium hydroxide for the sodium hydroxide. Other alkalis such as calcium hydroxide or dimethylamine give commensurate results.

The foregoing disclosure of this invention is not to be considered as limiting since many variations may be made by those skilled in the art without departing from the scope or spirit of the following claims:

I claim:

1. A method for decarboxylating trimellitic acid to form isophthalic acid which comprises heating trimellitic acid at a temperature between about 150° and 400° C. in the presence of water and a significant proportion of alkali which is less than stoichiometric but sufficient to increase materially the ratio of isophthalic acid/terephthalic acid formed over that formed in the absence of alkali, and recovering the resulting isophthalic acid.

2. A method as defined in claim 1 wherein the said alkali is a water-soluble monobasic alkali which forms water-soluble dihydrogen salts of trimellitic acid.

3. A method as defined in claim 1 wherein said alkali is selected from the class consisting of the hydroxides and alkaline salts of the alkali metals and ammonium.

4. A method as defined in claim 1 wherein the trimellitic acid hydrogen normality of the reactant solution is maintained at between about 1.5 and 30 times the normality of said alkali.

5. A method as defined in claim 1 wherein the trimellitic acid hydrogen normality of the reactant solution is maintained at between about 1.5 and 30 times the normality of said alkali, and wherein sufficient water is employed to provide at least about 500 ml. thereof per mole of dissolved trimellitic acid.

6. A continuous method for decarboxylating trimellitic acid to form isophthalic acid which comprises heating trimetllitic acid at a temperature between about 150° and 400° C. in the presence of water and a significant proportion of alkali which is less than stoichiometric but sufficient to increase materially the ratio of isophthalic acid/terephthalic acid formed over that formed in the absence of alkali, continuously removing a slip-stream of the reaction mixture, removing isophthalic acid from said slip-stream, replacing said isophthalic acid removed with approximately an equivalent mole-proportion of trimellitic acid, and then returning said slip-stream to the reaction mixture.

7. A method as defined in claim 6 wherein the trimellitic acid hydrogen normality of said reaction mixture is maintained at between about 1.5 and 30 times the normality of said alkali.

8. A method as defined in claim 6 wherein the trimellitic acid hydrogen normality of said reaction mixture is maintained at between about 1.5 and 30 times the normality of said alkali by cooling said slip-stream to a given temperature level at which the trimellitic acid solubility is just sufficient to provide the desired ratio of alkali to trimellitic acid, and saturating said slip-stream at said temperature with trimellitic acid.

9. A method for obtaining isophthalic acid from a mixture consisting predominantly of trimellitic acid, trimesic acid, hemimellitic acid, pyromellitic acid and prehnitic acid which comprises heating said acid mixture at a temperature between about 150° and 400° C. in the presence of water and an aqueous reaction mixture containing an alkali wherein the trimellitic acid hydrogen normality of said reaction mixture is maintained at between about 1.5 and 30 times the normality of said alkali, removing water-soluble acids from the decarboxylated mixture, and recovering therefrom substantially water-insoluble acid mixture which consists mainly of a major proportion of isophthalic acid and a minor proportion of terephthalic acid.

10. A process as defined in claim 9 wherein the said initial acid mixture is obtained by the oxidation of a mixture of isomeric C-9 and C-10 alkyl aromatic hydrocarbons, said hydrocarbon mixture boiling between about 150° and 200° C. and having been isolated from a gasoline obtained by the catalytic hydroforming of a naphthenic gasoline fraction.

11. A method for obtaining isophthalic acid from a mixture consisting predominantly of trimellitic acid, trimesic acid, and hemimellitic acid, which comprises heating said acid mixture at a temperature between about 150° and 400° C. in the presence of water and an aqueous reaction mixture containing an alkali wherein the trimellitic acid hydrogen normality of said reaction mixture is maintained at between about 1.5 and 30 times the normality of said alkali, removing water-soluble acids from the decarboxylated mixture, and recovering therefrom substantially water-insoluble acid mixture which consists mainly of a major proportion of isophthalic acid and a minor proportion of terephthalic acid.

No references cited.